(12) United States Patent
Matsuo

(10) Patent No.: US 11,861,254 B1
(45) Date of Patent: Jan. 2, 2024

(54) INDUSTRIAL PRINTING SYSTEM, SERVER, AND VARIABLE PRINTING METHOD FOR REPRINTING ARCHIVED JOBS BASED ON EXPIRY DATE

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/950,139

(22) Filed: Sep. 22, 2022

(51) Int. Cl.
   *G06F 3/12* (2006.01)
   *G06K 15/02* (2006.01)

(52) U.S. Cl.
   CPC ......... *G06F 3/1256* (2013.01); *G06F 3/1204* (2013.01); *G06F 3/1208* (2013.01); *G06F 3/1257* (2013.01); *G06F 3/1265* (2013.01); *G06F 3/1267* (2013.01); *G06K 15/1886* (2013.01); *G06F 3/12* (2013.01)

(58) Field of Classification Search
   None
   See application file for complete search history.

(56) References Cited

U.S. PATENT DOCUMENTS

| 10,866,773 | B2* | 12/2020 | Chang | H04L 67/56 |
| 2007/0206215 | A1* | 9/2007 | Iwase | H04N 1/00413 |
| | | | | 358/1.15 |
| 2012/0092695 | A1 | 4/2012 | Masuyama | |
| 2013/0329245 | A1* | 12/2013 | Nishida | G06F 3/1222 |
| | | | | 358/1.14 |
| 2016/0150116 | A1* | 5/2016 | Watariuchi | G06F 3/123 |
| | | | | 358/1.15 |

FOREIGN PATENT DOCUMENTS

JP    2012-086416 A    5/2012

* cited by examiner

*Primary Examiner* — Darryl V Dottin
(74) *Attorney, Agent, or Firm* — Hawaii Patent Services; Nathaniel K. Fedde; Kenton N. Fedde

(57) ABSTRACT

Provided is an industrial printing system that reprints each variable print record based on its expiration date. Industrial printing system X processes variable data for production printing. A variable attribute generation unit generates variable attribute information in which an expiration date is set for each record of variable data. An archive job generating unit generates an archive job for reprinting the variable data that includes the variable attribute information generated by the variable attribute generation unit. A reprint unit reprints each record of the archive job generated by the archive job generation unit based on the expiration date.

15 Claims, 7 Drawing Sheets

FIG. 4

```xml
<variable-data>
    <variable-recode>
        <recode-number>1</recode-number>
        <primary-key>CI-001<// primary-key>
        <pages>
            <start-page>1</start-page>
            <end-page>10</end-page>
        </pages>
        <contents>
            <content-id>JB0010001</content-id>
            <content-source>JB0010001</content-source>
            <content-expire>20221231</content-expire>
        </content>
        <contents>
            <content-id>JB0010002</content-id>
            <content-source>JB0010002</content-source>
            <content-expire>20221031</content-expire>
        </content>
        <contents>
            <content-id>JB0010003</content-id>
            <content-source>JB0010003</content-source>
            <content-expire>n/a</content-expire>
        </content>
        <archive-file></archive-file>
    </variable-recode>
    <variable-recode>
        <recode-number>2</recode-number>
        <primary-key>CI-002<// primary-key>
            ⋮
        <archive-file></archive-file>
    </variable-recode>
```

330

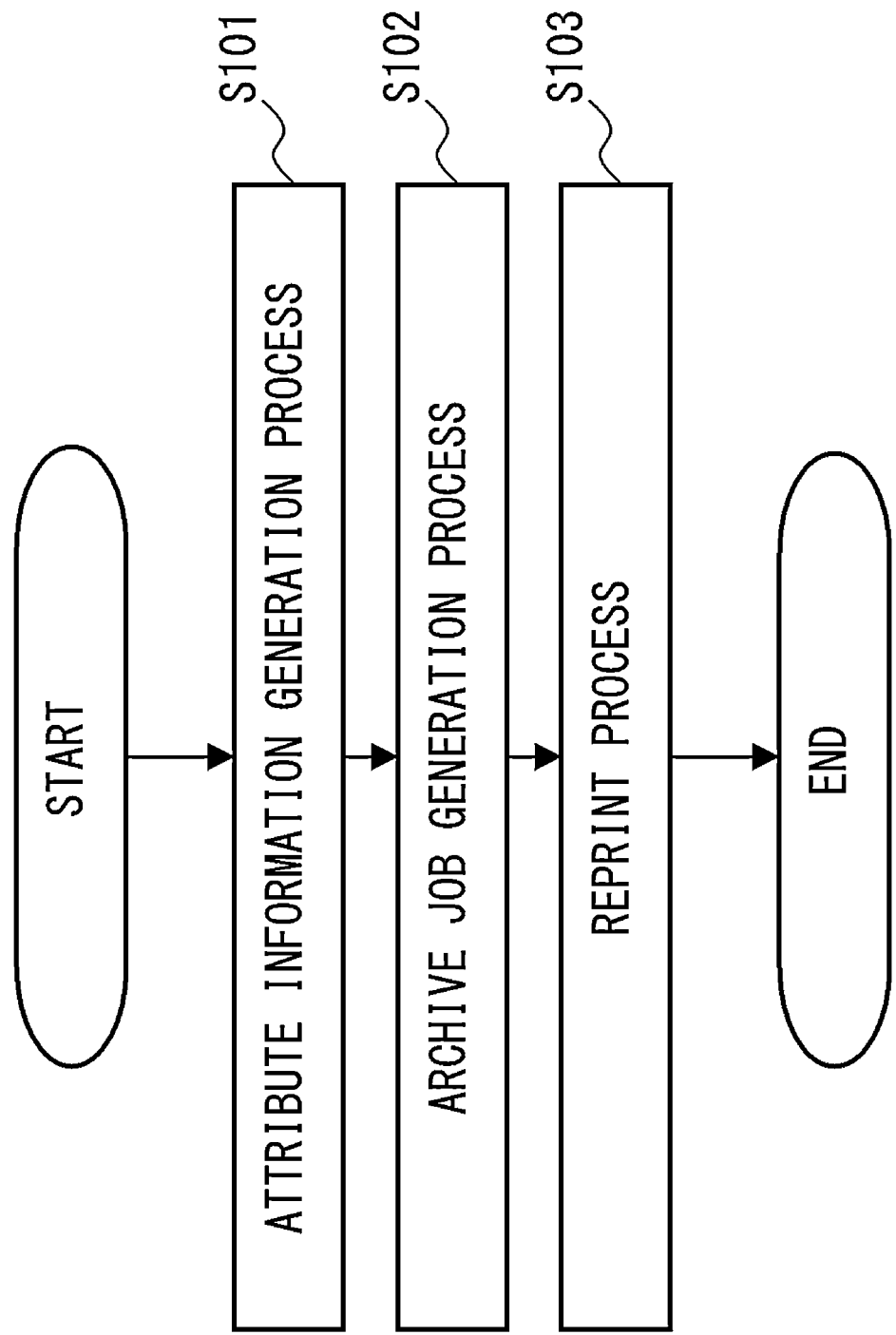

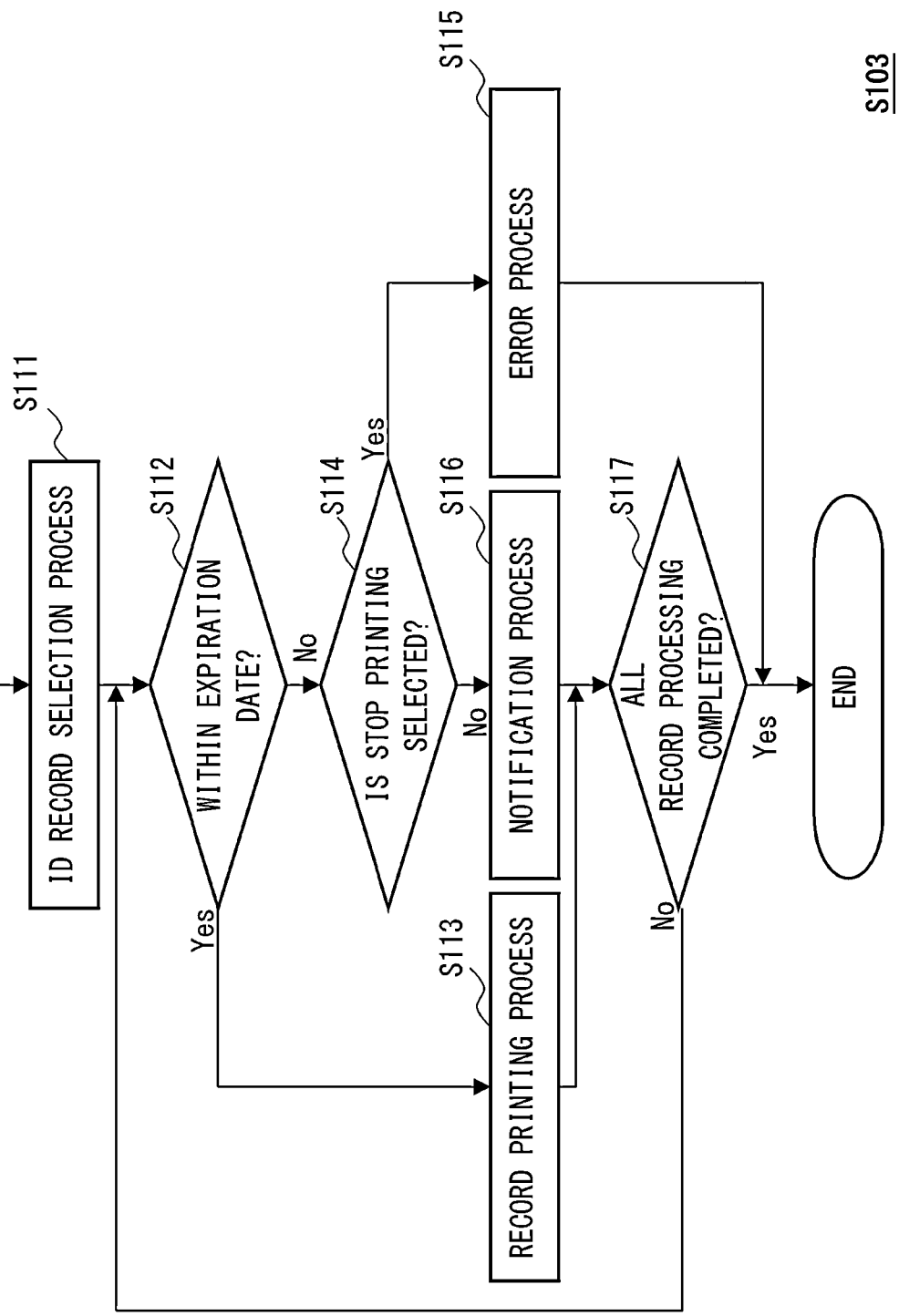

INDUSTRIAL PRINTING SYSTEM, SERVER, AND VARIABLE PRINTING METHOD FOR REPRINTING ARCHIVED JOBS BASED ON EXPIRY DATE

BACKGROUND

The present disclosure particularly relates to industrial printing systems, servers, and variable printing methods.

In industrial printing called production printing, which uses a commercial (industrial) printing apparatus, the configured members of the final product are produced by dividing the work into a plurality of processes. For example, in the case of bookbinding, a cover, a body (color), a body (black and white), a promotional item, a band, a shipping envelope, or the like, are processed as different jobs. Then, in the middle of the process, each job is combined and finished as a book (order) as the final product.

On the other hand, there is a variable printing technology that uses a common form, or the like, to perform different printing for each record in a database.

As a typical variable printing technology, an image forming apparatus is described that enables control of print jobs on a record-by-record basis and a subset-by-subset basis, and it improves the efficiency of processing the entire print job. In this technology, a variable print job in which pages set with the same finishing are grouped as a subset among a plurality of pages to be printed in each record is printed in units of records, and printing errors are detected. It is determined whether the printing error was detected on the first page in the record or the first page in a subset of records. If it is determined that a printing error was detected on the first page of the record, the printing process for the record is suspended. Then, if it is determined that a print error has been detected on the first page in the subset, print processing for the subset is suspended. If it is detected that the printing error has been cleared, the suspended printing process is resumed.

SUMMARY

An industrial printing system according to the present disclosure is an industrial printing system that processes variable data for production printing, including a variable attribute generation unit configured to generate variable attribute information in which an expiration date is set for each record of the variable data; an archive job generation unit configured to generate an archive job for reprinting the variable data that includes the variable attribute information generated by the variable attribute generation unit; and a reprint unit that reprints each the record of the archive job generated by the archive job generation unit based on the expiration date.

A server of the present disclosure is a server of an industrial printing system that processes variable data for production printing, including: a variable attribute generation unit configured to generate variable attribute information in which an expiration date is set for each record of the variable data; an archive job generation unit configured to generate an archive job for reprinting the variable data that includes the variable attribute information generated by the variable attribute generation unit; and a reprint unit that reprints each the record of the archive job generated by the archive job generation unit based on the expiration date.

A variable printing method according to the present disclosure is a variable printing method executed by a server of an industrial printing system for processing variable data for production printing, including the steps of: generating variable attribute information in which an expiration date is set for each record of the variable data; generating an archive job for reprinting the variable data that includes the generated variable attribute information; and reprinting each the record of the generated archive job based on the expiration date.

BRIEF DESCRIPTION OF THE DRAWINGS

FIG. 4 is a conceptual diagram of the attribute information as shown in FIG. 3;

FIG. 6 is a flowchart of variable archive process according to an embodiment of the present disclosure; and FIG. 7 is a flowchart showing details of the reprinting process as shown in FIG. 6.

DETAILED DESCRIPTION

Embodiment

[Configuration of Industrial Printing System X]

Figure 1:
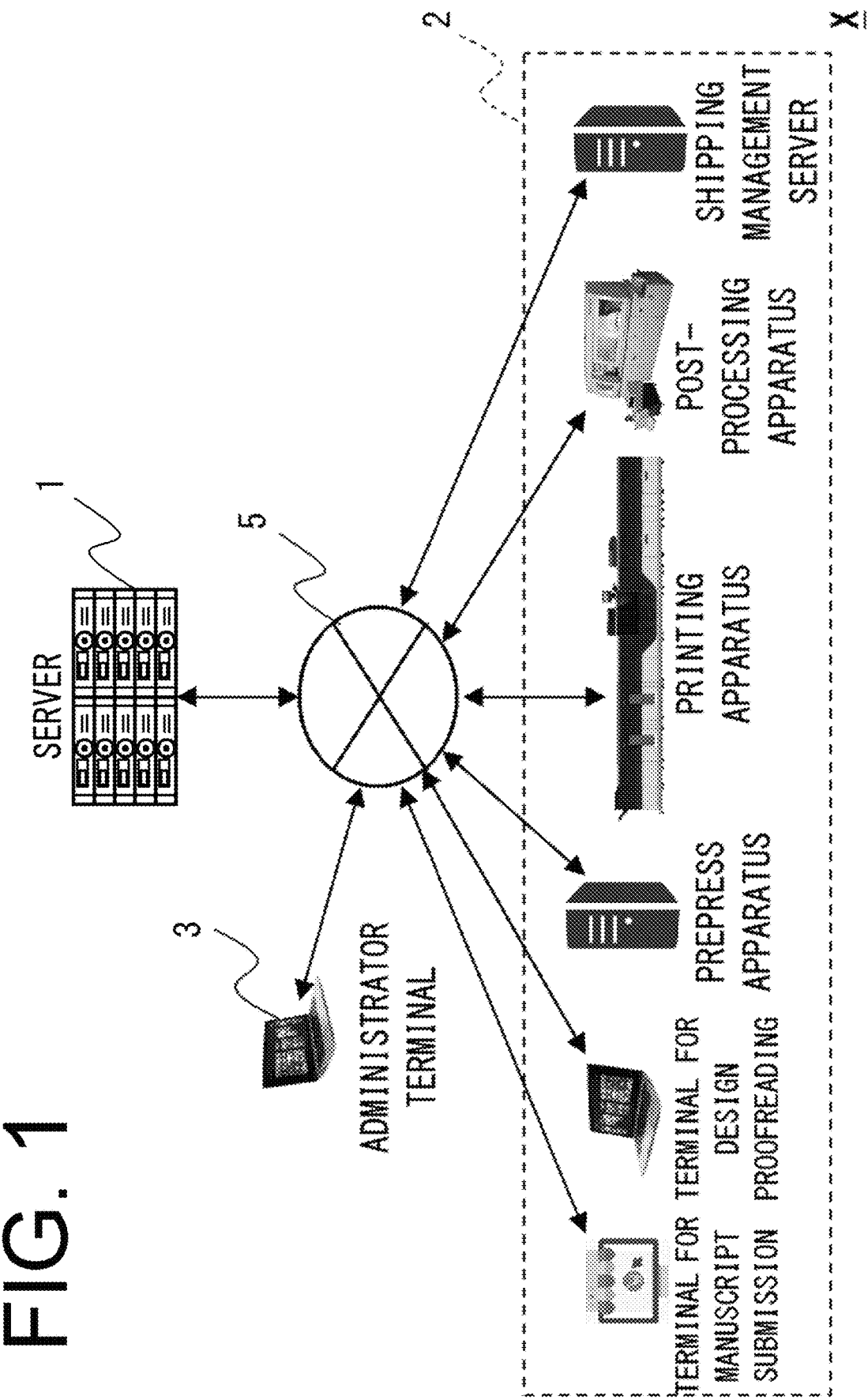
FIG. 1 is a system configuration diagram of an industrial printing system according to an embodiment of the present disclosure.

Firstly, with referring to FIG. 1, the overall system configuration of the industrial printing system X according to the present embodiment is described.

The industrial printing system X according to the present embodiment is a system that executes design and printing in industrial printing (production printing).

Here, in the industrial printing system X of the present embodiment, a final product such as a book, or the like, to be output is defined as an "order", and each component of the order is defined as a job. In the industrial printing system X of the present embodiment, each job for outputting the order is assigned to the component apparatus 2 and managed by the workflow.

The industrial printing system X according to the present embodiment is capable of once archiving the data of the printed job and reprinting it.

The industrial printing system X of the present embodiment includes a server 1, component apparatus(es) 2 and an administrator terminal 3, and each apparatus is connected with a network 5.

The server 1 is a server for designing variable printing in industrial printing and managing the workflow. The server 1 is a PC (Personal Computer) server, a dedicated machine, a general-purpose machine, or the like, placed on a so-called cloud or at a user's place.

Then, the server 1 designs a variable document by using dedicated design application software (hereinafter simply referred to as "application"). The server 1 also manages the industrial printing workflow by executing a printing process management application.

Specifically, the server 1 transmits and receives various instructions and information to and from the component apparatuses 2 in each process, and it manages the status of each component apparatus 2 and requests processing. At this time, the server 1 also processes, or the like, each configured job for unplanned processing such as change and cancellation occurring in the order.

Further, the server 1 may be a server that executes a common platform that performs user management, tenant management, security management, notification service for maintenance, prepress management, storage management of each document, printer management, and the like. The application described above may be executed on this server.

The component apparatus 2 is a component that executes various jobs of industrial printing, and is each apparatus managed by the server 1. The component apparatus 2 includes, for example, a terminal for manuscript submission, a terminal for design proofreading, a prepress apparatus, a printing apparatus, a post-processing apparatus, a delivery management server, and the like. One of these apparatuses is simply referred to as component apparatus 2 in the present embodiment. Among these, in the present embodiment, as the printing apparatus, a digital production printing apparatus, a digital offset printing apparatus, or the like, which is capable of variable printing, is used, preferably.

Each terminal and server in the component apparatus 2 can be connected with the server 1 via a web browser, a dedicated application, or the like, executed in a PC or a smartphone, or the like.

The manager terminal 3 is a terminal of a user who is the manager of the printing process. By using the administrator terminal 3, the administrator can access the server 1 to design a variable document by using a GUI, check the progress status, and request processing.

In the present embodiment, the administrator terminal 3 can give instruction to the server 1 to reprint the archived job 340 (FIG. 3) that was stored (archived) at the time of printing, and to set, or the like, the expiration date of the content and print stop.

Figure 2:
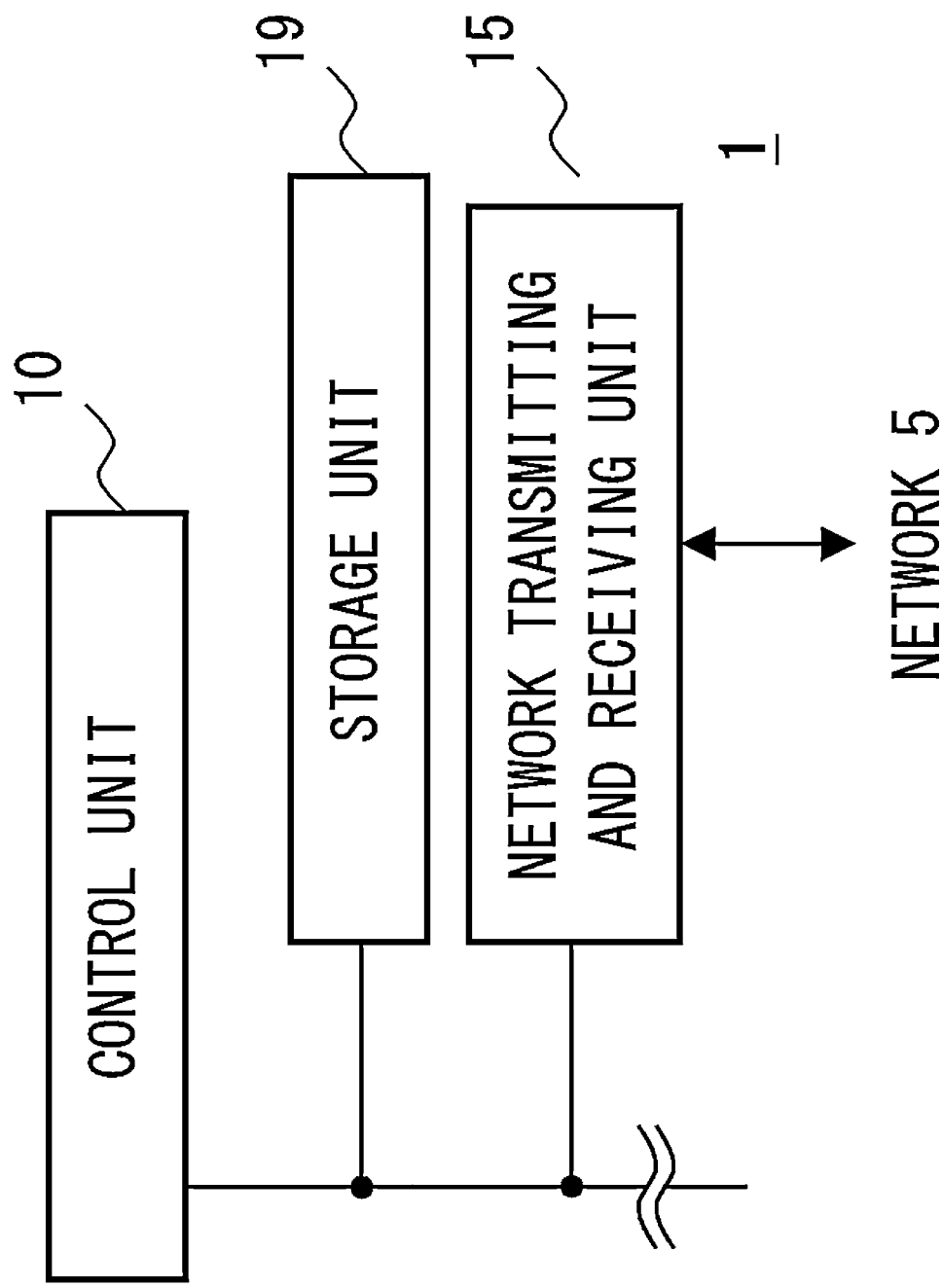
FIG. 2 is a block diagram showing the control configuration of the server as shown in FIG. 1.

Next, with referring to FIG. 2, the control configuration of the server 1 is described.

The server 1 includes a control unit 10, a network transmitting and receiving unit 15, a storage unit 19, and the like. Each unit is connected to the control unit 10 and controlled in operation by the control unit 10.

The control unit 10 includes GPP (General Purpose Processor), CPU (Central Processing Unit), MPU (Micro Processing Unit), DSP (Digital Signal Processor), GPU (Graphics Processing Unit), ASIC (Application Specific Integrated Circuit, application-specific processors), or the like.

The control unit 10 reads the control program stored in the ROM or HDD of the storage unit 19, expands the control program in the RAM, and executes it, thereby operating as each unit of the function blocks as described later. Further, the control unit 10 controls the entire apparatus according to instruction information input from the administrator terminal 3 or the console.

The network transmitting and receiving unit 15 is a network connection unit including a LAN board, a wireless transmitting and receiving device, and the like, for connecting to the network 5. The network 5 of the present embodiment is, for example, a LAN (Local Area Network), Wi-Fi, a WAN (Wide Area Network), a mobile telephone network, a voice telephone network, or the like.

The network transmitting and receiving unit 15 transmits and receives data through a data communication line, and it transmits and receives voice signals through a voice telephone line.

The storage unit 19 is a non-transitory recording medium such as semiconductor memory such as ROM (Read Only Memory) and RAM (Random Access Memory), or HDD (Hard Disk Drive), or the like.

The control program for controlling the operation of the server 1 is stored in the ROM or HDD of the storage unit 19. The control program includes an OS (Operating System), middleware on the OS, a service (a daemon), various applications, database data, and the like. Among these, various applications include the above-described design application, printing process management application, and the like.

In addition, the storage unit 19 also stores account settings for users and administrators of the industrial printing system X. Further, a storage area for each user may be set in the storage unit 19.

In addition, in server 1, the control unit 10 may be integrally formed, such as a CPU having built-in GPU, chip-on-module package, SOC (System On a Chip), or the like.

Also, the control unit 10 may integrate a RAM, a ROM, a flash memory, or the like.

[Functional Configuration of Server 1]

Figure 3:
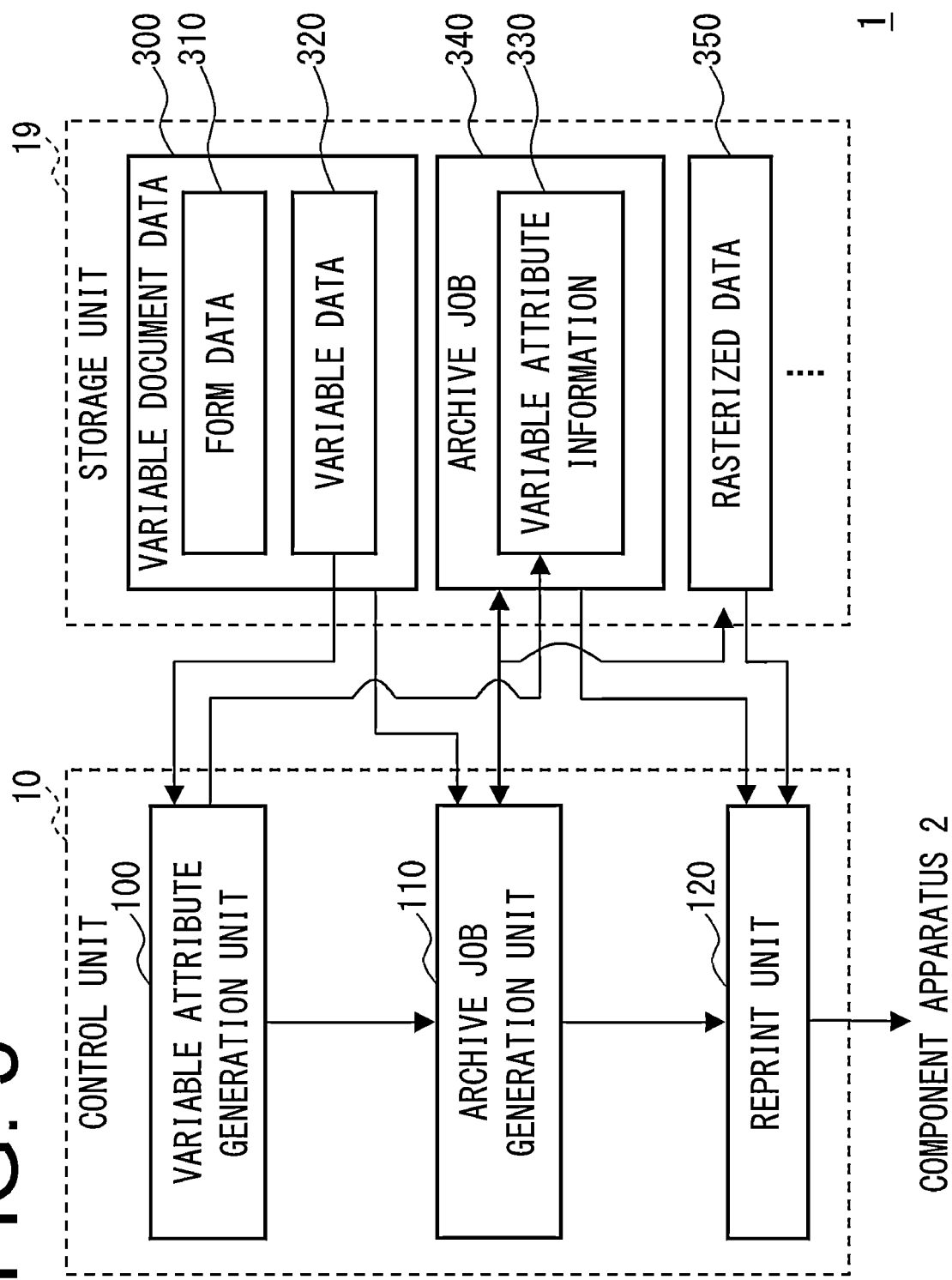
FIG. 3 is a block diagram showing the functional configuration of the industrial printing system according to the embodiment of the present disclosure.

Here, with reference to FIG. 3, the functional configuration of the server 1 of the industrial printing system X according to the present embodiment is described.

The control unit 10 of the server 1 includes a variable attribute generation unit 100, an archive job generation unit 110, and a reprint unit 120.

The storage unit 19 stores variable document data 300, variable attribute information 330, archive jobs 340, and rasterized data 350.

The variable attribute generation unit 100 acquires the variable data 320 of the variable document data 300 and generates variable attribute information 330.

Specifically, the variable attribute generation unit 100 puts together attribute information as variable attribute information 330 for each record of the variable data 320. In the present embodiment, for example, the variable attribute generation unit 100 sets the expiration date of each record of the variable data 320, the ID for identifying the record, and other conditions in the variable attribute information 330.

In addition, in the present embodiment, the variable attribute generation unit 100 can also generate the variable document data 300 itself. In this case, the variable attribute generation unit 100 can allow the user to design the variable document data 300 by using a GUI (Graphical User Interface) design application. In this case, a template of the design can be used.

The archive job generator 110 generates an archive job 340 including the variable attribute information 330 generated by the variable attribute generation unit 100.

At this time, the archive job generation unit 110 generates rasterized data 350 in which each record is rasterized, and it includes the rasterized data 350 in the archive job 340 as capable to be referenced.

The reprint unit 120 causes the component apparatus 2 to perform print processing each record of the archive job 340 generated by the archive job generation unit 110.

In the present embodiment, the reprint unit 120 reprints each record of the archive job 340 based on the expiration date, ID, other conditions, and the like. At this time, the reprint unit 120 may designate the customer, the area information, and the membership rank as the ID and reprint.

Furthermore, the reprint unit 120 can stop reprinting (stop printing) as error processing when a record whose validity period has expired is included during reprinting. Alternatively, the reprint unit 120 may not stop reprinting, but may notify the user of records that have expired and is not be reprinted. The reprint unit 120 can also make these selections by setting of printing stop.

In the present embodiment, as another condition, the reprint unit 120 may set the output destination to any one or any combination of print output, e-mail output, and electronic document output according to the set condition(s).

The variable document data 300 is a file, database, or the like, in which a variable document used in variable printing and various data related thereto are collected.

The variable document data 300 may be described, for example, in JDF (Job Description Format) and/or JMF (Job Messaging Format).

In the present embodiment, variable document data 300 includes form data 310 and variable data 320. These data may be included in the variable document data 300 as attribute data.

The form data 310 is data including a common form, or the like, for performing variable printing. The common form is data of part (s) that basically do not change at the time of printing. Specifically, the form data 310 may be data such as PDF (Portable Document Format), PDL (Page Description Language), and PPML (Personalized Print Markup Language) in XML (Extensible Markup Language) format. Among these, the PDF may be PDF/X, which is a subset of the standard PDF defined by the International Organization for Standardization (ISO15930), a simpler PDF, or the like.

Further, the form data 310 may include image data such as jpg, gif, BMP, PNG, TIFF, other document data, and other data. Additionally, the form data 310 may include layout information that defines the layout on the page, or the like. The layout information may include format information such as the position (coordinates) and size of the form on a page, font size of the variable data 320, left alignment, center alignment, and right alignment, or the like. Furthermore, the form data 310 may also include definitions of the element of the variable data 320, data describing the items of the element, data indicating the target of the attributes, and the like.

The variable data 320 is data for variable output in order to change the print content at the time of printing. The variable data 320 may be embedded in the variable document data 300 in, for example, a table format including a plurality of records, a database format such as XML, or the like.

Alternatively, the variable data 320 may be attached separately as a file in a format that is easy to handle as a database. In such case, the variable data 320 may be a database such as a tab-separated or comma-separated file, a spreadsheet application file, other types of database files, a list file, or the like.

In the present embodiment, each record of the variable data 320 may have attributes such as expiration date, an ID, a condition, and the like.

The variable attribute information 330 is data indicating attributes set for each record of the variable document. The attributes include information about each record and content information.

In the present embodiment, the variable attribute information 330 may be data in a format that is easy to handle as a database similar to the variable data 320.

In FIG. 4, an example of a part of the variable attribute information 330 is shown. In this example, variable attribute information 330 includes the following elements and attributes:

"recode-number" indicates the record number of the variable data 320.

"primary-key" is an example of an ID, and it is a variable data value that becomes a primary key when specifying conditions. In this example, a value that can identify a record, such as a customer ID, or the like, is set.

"pages" indicates the page number of the record including in the variable data 320. For example, pages such as "pages 1 to 10" are specified by "start-page" to "end-page".

"contents" or "content" indicates the content of the variable data 320.

"content-id" is an ID of the print component (content) (hereinafter referred to as "content ID"). The content ID may be uniquely set, for example, for each page when designing the variable document data 300. The content ID in this example is generated by combining the ID "JB001" of the variable document data 300 and the page number.

"content-source" is an ID indicating the source data of the content. In this example, a value similar to the content ID is set.

"content-expire" indicates the expiration date. In this example, year, month, and day is set as an attribute.

"archive-file" indicates the rasterized data 350. In this element, attributes are set when the record is performed raster-in-process (hereinafter, it is abbreviated as "RIP" or "rasterize"). That is, when the rasterized data 350 of the record is generated and stored, the value is set to refer to it.

In addition, at least part of the variable attribute information 330 may be described in a format compatible with JDF and/or JMF.

The archive job 340 is print job data for reprinting variable print data including the variable data 320. Specifically, the archive job 340 may be a file (a collection of data) in which various types of data used at the time of printing are structured and organized. Additionally, for example, the archive job 340 may also be written in JDF and/or (IMF.

Here, in the present embodiment, archive job 340 is saved for archiving for reprinting. At this time, the archive job 340 includes data corresponding to each record included in the variable data 320 of the variable document data 300. Specifically, archive job 340 structures and includes rasterized data 350 for each record.

Figure 5:
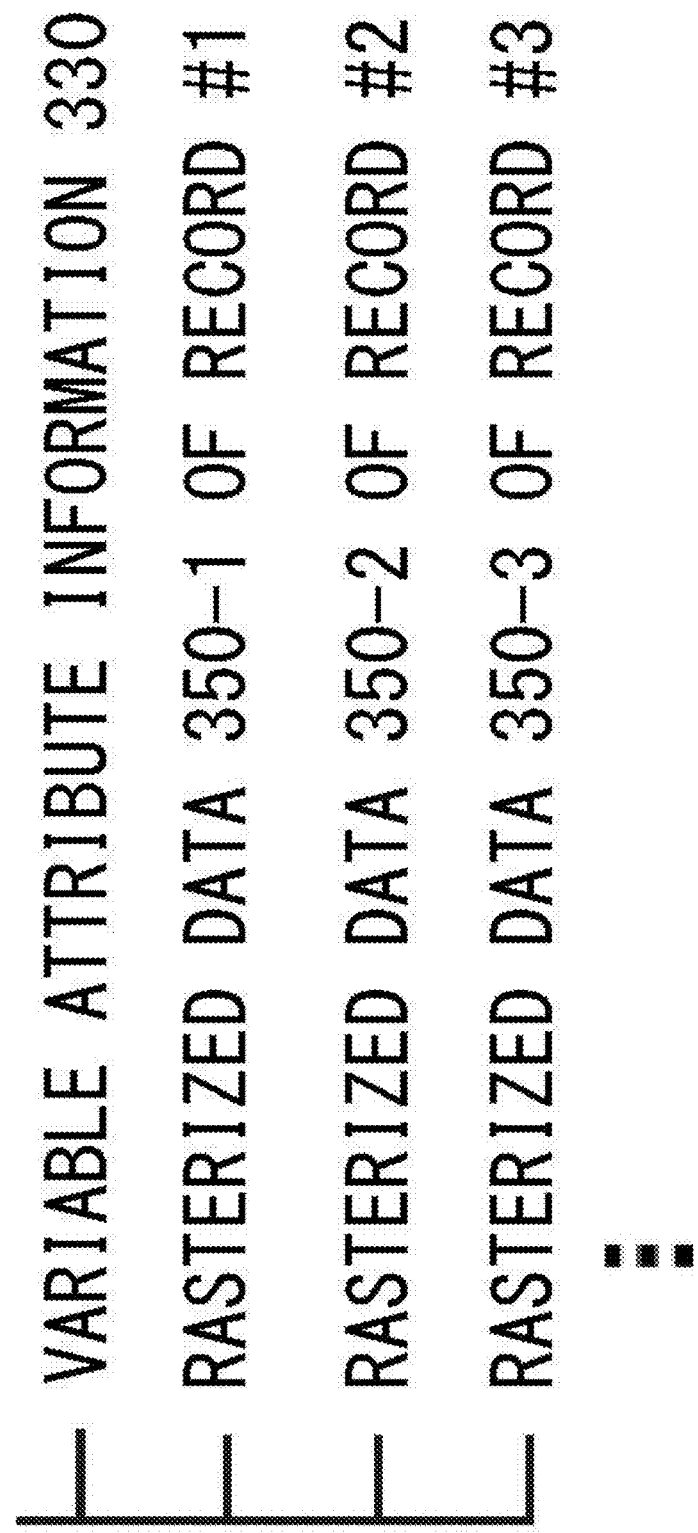
FIG. 5 is a conceptual diagram of the archive job as shown in FIG. 3.

In FIG. 5, an example of the structure of the archive job 340 is shown.

This example shows variable attribute information 330 and rasterized data 350 corresponding to each record are set.

Specifically, in the "rasterized data 350" section, for example, the file path of the storage location set in the "archive-file" of the variable attribute information 330 is specified in the following format:

"<archive-file>./arch/JB001/001.tif</archive-file>"

The archive job 340 may include settings for reprinting. Each of these settings includes a setting to stop printing when there is an expired record.

Further, the archive job 340 may include data created by prepress processing, corrections from the workflow, processing results of offset printing, and the like. In addition, archive job 340 may also include information that has been modified in response to prepress processing or post-processing.

The rasterized data 350 is a file of electronic document data obtained by performing RIP the print components.

In the present embodiment, the rasterized data 350 may be electronic document data such as PDF (Portable Document Format) in which each record of the variable document data 300 is printed, bitmap data (raster image data), the other type data, or the like. The image data in this rasterized data 350 may be reversibly compressed or irreversibly compressed.

In the present embodiment, an example is described in which the rasterized data 350 is image data such as TIFF, which is obtained by dividing a large PDF generated as print data in units of records.

In addition, the storage unit 19 may include workflow data.

The workflow data is data for setting a workflow for creating an order as a final product by combining job templates.

In the present embodiment, the workflow data includes provided data (hereinafter referred to as "template") for specifying conditions for each record of the variable data 320 for performing variable printing by using the variable document data 300. The template includes settings regarding what kind of archive job 340 is generated according to the conditions set for each record of the variable data 320.

Here, the control unit 10 of the server 1 is caused to function as a variable attribute generation unit 100, an archive job generation unit 110, and a reprint unit 120 by executing the control program stored in the storage unit 19.

Also, each part of the server 1 described above serves as a hardware resource for executing the variable printing method of the present disclosure.

In addition, a part or any combination of the above functional configurations may be configured in terms of hardware or circuitry by using an IC, programmable logic, FPGA (Field-Programmable Gate Array), or the like.

[Variable Archive Process by Industrial Printing System X]

Next, with reference to FIGS. 6 and 7, variable archive process by the industrial printing system X according to the embodiment of the present disclosure is described.

In the variable archiving process according to the present embodiment, when designing the variable document data 300, variable attribute information 330 in which the expiration date of each record of the variable data 320 is set is generated. Then, at the time of printing, an archive job 340 for reprinting the variable data 320 including the generated variable attribute information 330 is generated. Then, at the time of reprinting, each record of the generated archive job 340 is reprinted based on the expiration date.

In the variable archive process of the present embodiment, mainly the control unit 10 of the server 1 executes a control program stored in the storage unit 19 in cooperation with each unit and by using hardware resources.

In the follows, with reference to the flowchart of FIG. 6, details of the variable archive process are described step by step.

(Step S101)

Firstly, the variable attribute generation unit 100 performs variable attribute information generation process.

The variable attribute generation unit 100 creates a variable document in which condition(s) are set for each record.

Here, the variable attribute generation unit 100 generates variable document data 300 by using, for example, a template, or the like, according to the user's instruction via the GUI of the design application. At this time, the variable attribute generation unit 100 can create form data 310 and variable data 320.

The variable attribute generation unit 100 also generates variable attribute information 330 when creating the variable data 320. For example, the variable attribute generation unit 100 can set the expiration date, ID, condition(s), or the like, specified by the user in each record of the variable data 320 and set them as element(s) of the variable attribute information 330.

Here, the variable attribute generation unit 100 can designate the expiration date for each record, for example, in the case of content is advertisements, or the like. This is because if the expiration date has passed, it may not be necessary for reprinting.

In addition, the variable attribute generator 100 can set an ID for each record according to the user's designation of customer, area information, membership rank, and the like.

Specifically, for example, a postal code ID can be set as the area information. This enables processing such as reprinting only records with the same zip code.

As for the member rank, for example, it may be possible to designate "new customer", "existing customer", "ordinary member", "premium member", "VIP member", or the like, as an attribute according to the type of each record. This enables reprinting according to the attribute.

In addition, the variable attribute generation unit 100 can also specify conditions for data conversion. For example, it is possible to designate conversion to PDF/X for print output and conversion to low-resolution simple PDF for e-mail output.

In addition, the variable attribute generation unit 100 can also set records to be processed by printing apparatuses and post-processing apparatuses of different component apparatuses 2 as specification of conditions.

In addition, the variable attribute generation unit 100 can set, as a condition for each record, a condition designation that relates to a plurality of records, such as nesting condition designation, or the like.

In addition, the variable attribute generation unit 100 may specify conditions corresponding to various macros, "For" statements or and "While" statements as in high-level languages. Variables, constants, random numbers, or the like, can also be used to specify the conditions at this time.

For example, the variable attribute generation unit 100 can set conditions such as the first 100 people to come, a lottery "win", and the like.

Furthermore, the variable attribute generation unit 100 can also set conditions for record operations such as copying or deleting records, and conditions for changing or adding specific items in records, or the like.

Furthermore, the variable attribute generation unit 100 may use the setting as a "template" for specifying other conditions. This template can also be shared. That is, settings change, or the like, may be possible to be centrally managed. This may be done similarly to by using global instances of "classes" in object-oriented languages. As a result, the setting of condition may be used in a common manner as similar to the "class" of the object-oriented language.

In addition, the variable attribute generation unit 100 can also generate the template itself by using a GUI.

Furthermore, the variable attribute generation unit 100 is capable of direct specification by using JDF and/or JMF, programmatic description by using a so-called "macro" language, and the like, in addition to condition setting by using a GUI.

(Step S102)

Then, the archive job generation unit 110 performs archive job generation process.

The archive job generation unit 110 generates archive job 340 for reprinting variable data 320.

The archive job generator 110 causes the archive job 340 to include the variable attribute information 330.

Then, the archive job generation unit 110 generates rasterized data 350 in which each record is rasterized. The archive job generation unit 110 includes the rasterized data 350 in the archive job 340 so that it can be referenced.

Specifically, for example, the archive job generating unit 110 divides a PDF generated for printing into records, and extracts image data for each record. The archive job generation unit 110 stores these image data as the rasterized data 350 in the storage unit 19 for archiving. In addition, the archive job generation unit 110 sets the file path of the stored image data, or the like, in the variable attribute information 330 of the archive job 340.

(Step S103)

Then, the reprint unit 120 performs reprint process.

After generating the archive job 340, the reprint unit 120 reprints each record of the archive job 340 based on the expiration date as necessary.

The reprint unit 120 can also reprint based on the customer, the area information, the membership rank ID, and the condition designation.

Furthermore, the reprint unit 120 can also perform a setting to stop printing in accordance with the user's instruction, and it performs reprinting based on this setting.

The details of the reprinting process are described later.

With the above, the variable archive process according to the embodiment of the present disclosure completes.

[Details of Reprint Process]

Then, with reference to FIG. 7, details of the above-described reprinting process are described step by step.

(Step S111)

Firstly, the reprint unit 120 performs ID record selection process.

When the printing process management application is executed, the reprint unit 120 starts reprinting according to the user's instruction.

The reprint unit 120 selects the target archive job 340 to be reprinted, designates the record to be reprinted, and executes reprinting.

At this time, by specifying the ID set for a specific primary key, a record can be identified and reprinted. For example, when the customer ID is set as the primary key, the customer ID, such as "CI-001", "CI-005", "CI-009", or the like, can be specified, and only the searched records can be reprinted.

Alternatively, it is possible to identify a record by specifying a condition set on a specific primary key and reprint the record. For example, if the area information and the member rank are included as the primary keys, the record is identified by designating the ID of the specific area and the member rank. This membership rank may be "new customer", "existing customer", "ordinary member", "premium member", "VIP member", or the like.

Alternatively, it is also possible to specify only records based on the other conditional specification are to be reprinted.

In addition, the reprint unit 120 can set printing stop according to the user's instruction. That is, if there is an expired record, the reprint unit 120 can stop printing or notify the record that is not be reprinted based on the print stop setting, as is described later.

Further, the reprint unit 120 can specify record(s) to be processed by different printing apparatus or post-processing apparatus in component apparatuses 2 in the variable attribute information 330 and cause the record(s) to be reprinted.

Alternatively, the reprint unit 120 can set a condition in the variable attribute information 330 so as to extract only record(s) that can be processed by the capability of the component apparatus 2.

(Step S112)

Here, the reprint unit 120 starts processing each reprinted record and determines whether the record to be processed is within the expiration date. That is, the reprint unit 120 refers to the variable attribute information 330 of the archive job 340, checks the expiration date of the record to be processed, and if the content of this record is within the expiration date and the rasterized data 350 exists, it decides Yes. The reprint unit 120 determines No if the expiration date has passed.

In the case of Yes, the reprint unit 120 advances the process to step S113.

In the case of No, the reprint unit 120 advances the process to step S114.

(Step S113)

If the record is within the expiration date, the reprint unit 120 performs record printing process.

In the present embodiment, the reprint unit 120 processes each record of the archive job 340 based on the variable attribute information 330.

Here, the reprint unit 120 generates a job ticket for reprinting from the rasterized data 350 of the specified record and transmits it to the printing apparatus of the component apparatus 2. Alternatively, the reprint unit 120 can perform post-processing, send an e-mail, or perform simple printing.

Further, the reprint unit 120 can change the output according to the ID specification of the customer, the region information, and the member rank, and the other conditions. Specifically, the reprint unit 120 may set the output destination to any one of print output, e-mail output, and electronic document output, or an arbitrary combination, according to the ID.

Furthermore, the reprint unit 120 can cause processing by the post-processing apparatus, the shipping management server, or the like, in the component apparatus 2.

Then, the reprint unit 120 advances the process to step S117.

(Step S114)

If there is a record whose expiration date has passed, the reprint unit 120 determines whether or not stop printing has been selected. If the stop printing has selected by the user setting, the reprint unit 120 determines Yes. Otherwise, the reprint unit 120 determines No, that is a case in which stop printing has not been selected.

In the case of Yes, the reprint unit 120 advances the process to step S116.

In the case of No, the reprint unit 120 advances the process to step S115.

(Step S115)

If stop printing is selected, the reprint unit 120 performs error process.

Here, the reprint unit 120 stops reprinting and displays an error.

In this case, for example, the reprint unit 120 can display the information of the record including the content that has been expired the expiration date as the error information on the administrator terminal 3, or the like.

After that, the reprint unit 120 completes the reprinting process.

(Step S115)

If print stop is not selected, the reprint unit 120 performs notification process.

The reprint unit 120 prints only the record(s) within the expiration date and notifies the user of the record(s) that are not to be reprinted.

Here, the reprint unit 120 performs reprinting except for the record that include expired content. At this time, after the reprinting, the reprint unit 120 displays the information of the printed record and the information of the record that was not printed because of the record including content whose expiration date has passed on the administrator terminal 3, or the like, and it notifies the user.

(Step S116)

Here, the reprint unit 120 determines whether or not all records have been processed.

If the reprint unit 120 has finished determining whether or not to reprint all the records selected by the user, it determines that the processing is completed, and determines Yes. The reprint unit 120 determines No if the processing of all the records has not been completed yet.

In the case of Yes, the reprint unit 120 completes the reprinting process.

In the case of No, the reprint unit 120 returns the process to step S112 to continue processing the next record.

As configured in this way, the following effects can be obtained.

In digital printing for production printing, variable printing is the most characteristic digital printing job. For this reason, printing companies have become one of the purposes of introducing the digital production printing apparatuses. In addition, there have been many cases where the same printed material is reprinted by a printing company for regular orders, reprints, and the like.

However, in typical variable printing, when reprinting, the same variable data as the previous time is reprinted regardless of whether it is valid, an archival print job might be printed that has already been invalid in the time of reprinting.

On the other hand, the industrial printing system X according to the embodiment of the present disclosure is an industrial printing system that processes variable data 320 for production printing, including a variable attribute generation unit 100 that generates variable attribute information 330 in which an expiration date is set for each record of the variable data 320; an archive job generation unit 110 that generates an archive job 340 for reprinting the variable data 320 that includes the variable attribute information 330 generated by the variable attribute generation unit 100; and a reprint unit 120 that reprints each record of the archive job 340 generated by the archive job generation unit 110 based on the expiration date.

With this configuration, an archive job 340 is generated in consideration of the expiration date of the contents of the variable data 320, and variable printing is managed. As a result, the print job of variable printing can be used as the archive job 340, and each record can be reprinted in consideration of the expiration date. Here, by checking the expiration date of the content, the printing of already invalid records can be prevented when reprinting. Therefore, printing errors can be reduced, and printing costs can be reduced.

Further, in the industrial printing system. X according to the embodiment of the present disclosure, the archive job generation unit 110 generates rasterized data 350 obtained by rasterizing each of the records and includes the rasterized data 350 in the archive job 340 to be referenced.

By configuring in this manner, not only the original document but also the rasterized data can be stored and managed by the archive job 340. As a result, when reprinting, the saved rasterized data 350 can be reliably referred to for printing. As a result, when reprinting, reliable reprinting can be performed with the same quality as the previous printing.

Further, in reprinting the typical variable data 320, requests such as reprinting only specific records instead of all data could not be accommodated.

On the other hand, in the industrial printing system X according to the embodiment of the present disclosure, an ID for identifying the record is also set in the variable attribute information 330, and the reprint unit 120 reprints based on the ID as well.

With this configuration, a record can be specified by ID of the variable data 320, or the like. Therefore, only specific records according to the user's intention can be reprinted, easily.

In the industrial printing system X according to the embodiment of the present disclosure, the ID designates the customer, area information, and membership rank, and the reprint unit 120 reprints based on the designation of the customer, the area information, and the membership rank.

By configuring in this way, the IDs for the customer, the area information, and the membership rank can be specified, and reprinting based on the specification of these Ids can be performed. As a result, in addition to the expiration date, reprinting can be performed by designating the necessary record with the specific ID.

In the industrial printing system X according to the embodiment of the present disclosure, when the record whose validity period has expired is included during reprinting, the reprint unit 120 selects whether to stop reprinting as error processing or to notify the record not to be reprinted to the user.

With this configuration, if there is a content record whose expiration date has passed, whether to stop with an error or to ignore and notify only the record not to be reprinted can be selected. Therefore, reprinting can be performed in accordance with the user's intention.

Other Embodiments

In addition, in the above-described embodiment, an example of only reprinting the archive job 340 has been described.

However, archive job 340 may also be configured for use in post-processing steps. In addition, the archive job 340 may change prepress, printing, post-processing, output destination, or the like, according to the conditions set in the record. It is also possible to specify conditions such that when there are few records, only the digital printer is used for printing, and when there are many records, the offset printer is used.

Also, other conditions such as the number of records with the same ID or the file type of the records may be set.

Also, if there are a plurality of component apparatuses 2 as output destinations, the apparatus may be selected according to a priority according to conditions. For example, in the "record conditions", if "VIP member" is designated, a printing apparatus with high resolution and ink count is specified. Otherwise, if "regular member" is designated, a digital printing apparatus with low printing costs and a normal finish is specified, or the like.

By configuring in this way, various conditions can be set and variable printing actually required in the industrial printing system can be performed.

Also, in the above embodiment, the variable attribute information 330 is changed only when the rasterized data 350 is generated.

However, the variable attribute information 330 may be changed according to the situation after the previous printing, the processing result, and the like. In this case, only the item may be changed, or the variable attribute information 330 itself may be changed. For example, if the results of a questionnaire show that many "VIP members" also want to send e-mails, a change may be automatically made to send e-mails at the same time as outputting printed matter.

Furthermore, similarly, the form data 310 and the variable data 320 of the variable document data 300 may also be automatically changeable according to the processing results after output.

By configuring in this way, variable printing in an industrial printing system that is more suited to the actual situation can be performed.

Also, in the above-described embodiment, the example in which the archive job 340 is retained as it is even after being reprinted has been described.

However, archive job 340 may be deleted after being reprinted. Also, the rasterized data 350 may be deleted after the expiration date or even before the expiration date. Furthermore, it is also possible to delete the rasterized data 350 only for records whose expiration date has passed.

By configuring in this way, security can be taken into consideration.

Also, in the above-described embodiment, an example in which the variable attribute information 330 is stored in the archive job 340 has been described.

However, variable attribute information 330 may be set in variable data 320. Alternatively, the variable attribute information 330 may be data such as a database different from the archive job 340. In these cases, the original reference data may be included in the archive job 340 or the variable data 320. Furthermore, variable attribute information 330 may be configured to include rasterized data 350. In this case, data such as PDF corresponding to each record may be used. Also, by not generating the rasterized data 350 in the first place, the amount of data may also be reduced, possibly.

By configuring in this way, it becomes possible to correspond to various configurations.

Also, in the above-described embodiment, an example of setting the ID, or the like, for each record during normal printing has been described.

However, it is also possible to set the ID directly for each record when reprinting. In this case, the printing process management application or the design application may allow the user to make settings by using a GUI. For example, the variable attribute generation unit 100 can acquire the user's instruction and set the ID. As a result, the variable attribute information 330 and the record itself of the variable data 320 of the variable document data 300 can also be changed.

In the above embodiments, an example of automatically generating the archive job 340 was described.

However, it may also be possible for the user to directly create the archive job 340 according to the conditions set by the variable attribute generation unit 100.

Further, when printing multiple times, it may be possible to set the archive job 340 to be generated each time or only at specified time(s).

Also, in the above-described embodiment, an example was described in which the archive job 340 is process attribute data such as JDF and/or JMF. However, archive job 340 may also be able to use data in formats such as macro languages and programming languages.

Also, in the above embodiment, an example of creating the archive job 340 described in JDF and/or JMF and performing each process of the variable document has been described.

However, JDF and/or JMF may not be created. In this case, a job ticket that directly controls each apparatus may be generated according to the conditions set in each variable attribute information 330. Thereby, the control similar to that of the archive job 340 may be performed.

By configuring in this way, various configurations can be applied.

In the above-described embodiment, examples of variable printing on paper printed matter, sending of e-mail, and electronic document output have been described as production printing, but other production printing can also be applied.

For example, variable book printing, on-demand printing, and other printing are also applicable.

Alternatively, for example, it can also be used for divided printing of large-sized posters, sheet printing for the exterior and interior of aircraft and automobiles, manufacture of electronic components such as flat displays and electronic substrates, and printing of cultured cells. In this case, as the component apparatus 2, an industrial inkjet printer, an industrial robot, various reaction apparatuses, a culture apparatus, or the like, can be used.

By configuring in this way, it becomes possible to correspond to various uses.

Further, in the above-described embodiment, an example in which the server 1 performs various processes has been described.

However, it may be configured by using a dedicated terminal for creating the variable data 320, by using another server for managing the workflow, by performing prepress processing via the administrator terminal 3, by using an e-mail transmission server, or the like. Further, the other apparatus may be configured to create and control the variable document data 300 and the archive job 340.

Further, the configuration and operation of the above-described embodiment are examples, and needless to say, they can be modified and executed as appropriate without departing from the aim of the present disclosure.

What is claimed is:

1. An industrial printing system that processes variable data for production printing, comprising:
   a variable attribute generation unit configured to generate variable attribute information in which an expiration date is set for each record of the variable data;
   an archive job generation unit configured to generate an archive job for reprinting the variable data that includes the variable attribute information generated by the variable attribute generation unit; and
   a reprint unit that reprints each the record of the archive job generated by the archive job generation unit based on the expiration date.

2. The industrial printing system according to claim 1, wherein:
   the archive job generation unit generates rasterized data obtained by rasterizing each of the records and includes the rasterized data in the archive job to be referenced.

3. The industrial printing system according to claim 1, wherein:
   an ID for identifying the record is also set in the variable attribute information, and
   the reprint unit reprints based also on the ID.

4. The industrial printing system according to claim 3, wherein:
   the ID designates a customer, area information, and membership rank, and
   the reprint unit reprints based on designation of the customer, the area information, and the membership rank.

5. The industrial printing system according to claim 1, wherein:
   the reprint unit selects whether to stop reprinting as error processing or to notify the record not to be reprinted to the user when the record whose validity period has expired is included during reprinting.

6. A server for an industrial printing system that processes variable data for production printing, comprising:
a variable attribute generation unit configured to generate variable attribute information in which an expiration date is set for each record of the variable data;
an archive job generation unit configured to generate an archive job for reprinting the variable data that includes the variable attribute information generated by the variable attribute generation unit; and
a reprint unit that reprints each the record of the archive job generated by the archive job generation unit based on the expiration date.

7. The server according to claim 6, wherein:
the archive job generation unit generates rasterized data obtained by rasterizing each of the records and includes the rasterized data in the archive job to be referenced.

8. The server according to claim 6, wherein:
an ID for identifying the record is also set in the variable attribute information, and
the reprint unit reprints based also on the ID.

9. The server according to claim 8, wherein:
the ID designates a customer, area information, and membership rank, and
the reprint unit reprints based on designation of the customer, the area information, and the membership rank.

10. The server according to claim 6, wherein:
the reprint unit selects whether to stop reprinting as error processing or to notify the record not to be reprinted to the user when the record whose validity period has expired is included during reprinting.

11. A variable printing method executed by a server of an industrial printing system for processing variable data for production printing, comprising the steps of:
generating variable attribute information in which an expiration date is set for each record of the variable data;
generating an archive job for reprinting the variable data that includes the generated variable attribute information; and
reprinting each the record of the generated archive job based on the expiration date.

12. The variable printing method according to claim 11, wherein:
generating rasterized data obtained by rasterizing each of the records and including the rasterized data in the archive job to be referenced.

13. The variable printing method according to claim 11, wherein:
an ID for identifying the record is also set in the variable attribute information, and
reprinting based also on the ID.

14. The variable printing method according to claim 13, wherein:
the ID designates a customer, area information, and membership rank, and
reprinting based on designation of the customer, the area information, and the membership rank.

15. The variable printing method according to claim 11, wherein:
selecting whether to stop reprinting as error processing or to notify the record not to be reprinted to the user when the record whose validity period has expired is included during reprinting.

* * * * *